(12) United States Patent
Reiner et al.

(10) Patent No.: US 9,953,075 B1
(45) Date of Patent: Apr. 24, 2018

(54) DATA CLASSIFICATION SYSTEM FOR HYBRID CLOUDS

(71) Applicant: EMC Corporation, Hopkinton, MA (US)

(72) Inventors: David Stephen Reiner, Lexington, MA (US); Lintao Wan, Shanghai (CN); Qiyan Chen, Shanghai (CN); Tianqing Wang, Shanghai (CN); Feng Golfen Guo, Shanghai (CN); Dong Xiang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 989 days.

(21) Appl. No.: 13/728,490

(22) Filed: Dec. 27, 2012

(51) Int. Cl.
G06F 17/30 (2006.01)
G06N 99/00 (2010.01)

(52) U.S. Cl.
CPC ..... *G06F 17/30598* (2013.01); *G06N 99/005* (2013.01)

(58) Field of Classification Search
CPC ....................................................... G06F 17/30
See application file for complete search history.

(56) References Cited

U.S. PATENT DOCUMENTS

| | | | |
|---|---|---|---|
| 2007/0038438 A1* | 2/2007 | Cho ................. | G06F 17/30734 704/9 |
| 2008/0071731 A1* | 3/2008 | Ma ................... | G06F 17/30734 |
| 2008/0126280 A1* | 5/2008 | Liu ................... | G06N 99/005 706/20 |
| 2010/0023997 A1* | 1/2010 | Hu .................... | G06F 21/6218 726/1 |
| 2010/0275241 A1* | 10/2010 | Srinivasan ........ | G06F 9/468 726/1 |
| 2011/0055398 A1* | 3/2011 | Dehaan ............. | G06F 9/5077 709/226 |

(Continued)

OTHER PUBLICATIONS

U.S. Appl. No. 13/336,613, filed in the name of D.S. Reiner et al. on Dec. 23, 2011 and entitled "Managing Data Sets by Reasoning Over Captured Metadata."

(Continued)

*Primary Examiner* — Apu Mofiz
*Assistant Examiner* — Farhad Agharahimi
(74) *Attorney, Agent, or Firm* — Ryan, Mason & Lewis, LLP

(57) ABSTRACT

A data classification system is associated with a hybrid cloud comprising at least one private cloud and at least one public cloud. The data classification system comprises a data set classification model classifying data sets, a cloud classification model classifying the private and public clouds of the hybrid cloud, and mapping policies each specifying a particular mapping between one or more classes of the data set classification model and one or more classes of the cloud classification model. The data classification system classifies a received data set using the data set classification model, and determines for the received data set at least one cloud of the hybrid cloud to which the received data set should be directed for further processing based at least in part on a result of the classification of the received data set, the cloud classification model and a selected one of the mapping policies.

22 Claims, 5 Drawing Sheets

(56) References Cited

U.S. PATENT DOCUMENTS

2011/0270968 A1* 11/2011 Salsburg ............... G06F 9/5072
709/224

OTHER PUBLICATIONS

W3C OWL Working Group, "OWL 2 Web Ontology Language Document Overview," W3C Recommendation, Oct. 2009, 12 pages.
W3C OWL Working Group, "RDF/XML Syntax Specification (Revised)," W3C Recommendation, Feb. 2004, 44 pages.
W3C OWL Working Group, "RDF Vocabulary Description Language 1.0: RDF Scheme," W3C Recommendation, Feb. 2004, 11 pages.
W3C OWL Working Group, "Resource Description Framework (RDF): Concepts and Abstract Syntax," W3C Recommendation, Feb. 2004, 20 pages.
W3C OWL Working Group, "RDF Semantics," W3C Recommendation, Feb. 2004, 51 pages.
W3C OWL Working Group, "RDF Test Cases," W3C Recommendation, Feb. 2004, 19 pages.
W3C OWL Working Group, "RDFa in XHTML: Syntax and Processing," W3C Recommendation, Oct. 2008, 55 pages.

* cited by examiner

FIG. 3

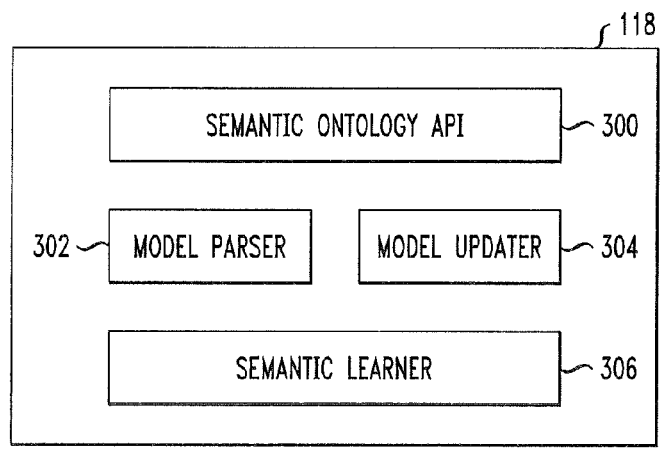

FIG. 4

```
<rdf:RDF
  xmlns:rdf=http://www.w3.org/1999/02/22-rdf-syntax-ns#
  xmlns:dc=http://www.emc.com/dataclassifier/1.0/>
    <dc:DocId> Document Identifier 1 </dc:DocId>
    <rdf:Properties>
        <dc:title>Quarter Planning</dc:title>
        <dc:author>Tony Wan</dc:author>
        ......
    </rdf:Properties>
    <dc:Attachments>
        <dc:Attachment>
            <dc:Type>email</dc:Type>
            <dc:DocId> Document Identifier 2 </dc:DocId>
        </dc:Attachment>
    </dc:Attachments>
</rdf:RDF>
```

DATA CLASSIFICATION SYSTEM FOR HYBRID CLOUDS

FIELD

The field relates generally to information processing systems, and more particularly to processing techniques utilized within such systems.

BACKGROUND

An increasing number of companies and other enterprises are reducing their costs by migrating portions of their information technology (IT) infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

Many enterprises prefer to adopt IT arrangements involving a hybrid cloud that includes a combination of private and public clouds. This is due at least in part to cost issues associated with deployment of private clouds, and security issues associated with use of public clouds. Hybrid clouds allow the enterprise to obtain the significant advantages of both private and public clouds while avoiding some of the drawbacks associated with using only private or public clouds.

However, there are also significant challenges in adopting a hybrid cloud approach. For example, one major challenge involves determining when and under what conditions to utilize a private or public cloud for particular types of enterprise data. Issues associated with such a determination may include meeting criteria such as performance metrics and legal and regulatory requirements. Conventional practice is deficient in this regard, and often relies on rigid and inefficient policies.

SUMMARY

Illustrative embodiments of the present invention provide techniques for automatic data classification involving performance of reasoning operations based on one or more semantic ontologies. For example, certain of these techniques utilize data set and cloud classification models and associated mapping policies in order to determine an appropriate placement of data sets in private and public clouds of a hybrid cloud.

In one embodiment, a data classification system is associated with a hybrid cloud comprising at least one private cloud and at least one public cloud. The data classification system comprises a data set classification model classifying data sets, a cloud classification model classifying the private and public clouds of the hybrid cloud, and a plurality of mapping policies each specifying a particular mapping between one or more classes of the data set classification model and one or more classes of the cloud classification model. The data classification system is configured to classify a received data set using the data set classification model, and to determine for the received data set at least one cloud of the hybrid cloud to which the received data set should be directed for further processing based at least in part on a result of the classification of the received data set, the cloud classification model and a selected one of the mapping policies.

The data classification system may be implemented using one or more processing devices of a processing platform of an information processing system.

One or more of the illustrative embodiments advantageously overcome the above-noted drawbacks of conventional practice. For example, through the use of reasoning operations based on one or more semantic ontologies, embodiments of the invention can ensure that data sets are automatically stored or otherwise processed in the appropriate private or public cloud in a manner that satisfies dynamic enterprise policy requirements.

BRIEF DESCRIPTION OF THE DRAWINGS

FIG. 3 shows a more detailed view of one possible embodiment of a reasoner implemented in the data classification system of FIG. 1.

FIG. 4 illustrates an RDF representation of a document processed by the data classification system of FIG. 1.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
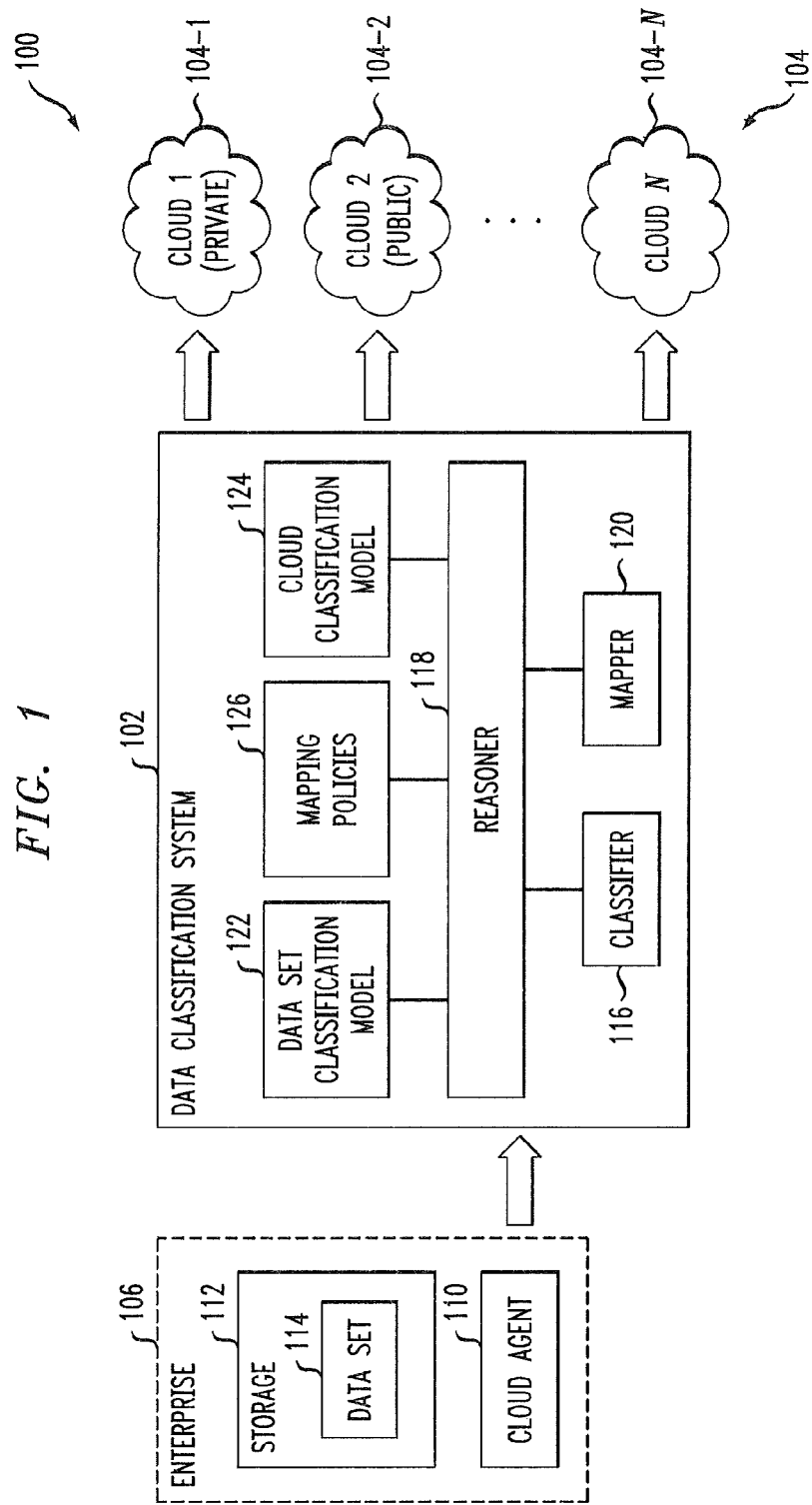
FIG. 1 is a block diagram of an information processing system comprising a data classification system for a hybrid cloud in an illustrative embodiment of the invention.

FIG. 1 shows an information processing system 100 configured in accordance with an illustrative embodiment of the present invention. The information processing system 100 comprises a data classification system 102 that communicates with a hybrid cloud 104. The hybrid cloud 104 comprises a plurality of separate clouds 104-1, 104-2, ... 104-N, at least one of which comprises a private cloud and at least one of which comprises a public cloud. In this embodiment, cloud 104-1 is denoted as a private cloud and cloud 104-2 is denoted as a public cloud.

The hybrid cloud 104 may include other types of clouds such as cloud 104-N that are not specifically classified as private or public. Also, a wide variety of additional or alternative cloud classification parameters in addition to or in place of public and private may be used. For example, there may be different levels of classification for a given public cloud or a given private cloud, possibly using parameters such as auditability, availability, capacity, colocation, cost, performance and security. Accordingly, selective placement of data sets in clouds as disclosed herein may involve distinguishing between at least first and second clouds of different types based on one or more of the above-noted cloud classifications. The term "hybrid cloud" as used herein is intended to encompass any set of clouds comprising at least two clouds of different types.

The data classification system 102 is coupled between an enterprise environment 106 and the hybrid cloud 104. The enterprise environment communicates with data classification system 102 via a cloud agent 110. The enterprise environment 106 includes, in addition to the cloud agent 110, a storage system 112 that stores one or more data sets 114. The storage system 112 may be viewed as an example of what is more generally referred to herein as an "enterprise storage system."

The cloud agent 110 may comprise, for example, one or more conventional adaptors typically utilized by an enterprise environment to access cloud storage. Thus, the cloud agent can serve as an access point for different types of cloud storage in hybrid cloud 104 via the data classification system 102.

The data classification system 102 comprises a classifier 116, a reasoner 118 and a mapper 120. These elements of the data classification system 102 are configured to utilize a data set classification model 122 classifying data sets, a cloud classification model 124 classifying the various separate clouds of the hybrid cloud 104, and mapping policies 126 each specifying a particular mapping between one or more classes of the data set classification model 122 and one or more classes of the cloud classification model 124.

In operation, the data classification system 102 receives one or more data sets 114 from the enterprise storage system 112 via the cloud agent 110, classifies the data sets using the data set classification model 122, and determines for each of the received data sets at least one cloud of the hybrid cloud 104 to which the received data set should be directed for storage or other type of further processing based at least in part on the result of the classification of the received data set, the cloud classification model 124 and a selected one of the mapping policies 126. The models 122 and 124 may each be based at least in part on one or more rules, or other types of information. Thus, for example, a given classification model as disclosed herein may be implemented in the form of a set of rules.

The above-described functionality of data classification system 102 is implemented in the present embodiment using classifier 116, reasoner 118 and mapper 120. More particularly, the classifier 116 is configured to classify the received data sets in accordance with the data set classification model 122, the reasoner 118 is configured to determine selected mapping policies for respective ones of the received data sets, and the mapper 120 is configured to apply the selected mapping policy for each of the received data sets to determine the particular cloud or clouds of the hybrid cloud 104 to which that received data set should be directed for further processing.

A given data set received by the data classification system 102 need not be a data set that is stored in enterprise storage system 112. Instead, such a data set may be received from another element of the enterprise environment 106. For example, data sets may be streamed to the data classification system 102 from one or more applications running on processing devices in the enterprise environment.

A "data set" as the term is used herein may be viewed as an abstraction of one or more data items, such as a table, document, file, query result, key-value pairs, index, storage block contents, in-memory caches or other data item or combinations thereof, where the given data set is characterized by properties as well as relationships to other data sets. These properties and relationships are captured by metadata that is associated with the data set in the information processing system 100.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata," which is commonly assigned herewith and incorporated by reference herein.

In the present embodiment, the data classification system 102 is configured to receive one or more data sets 114 and associated metadata from the cloud agent 110 associated with the enterprise storage system 112. By way of example, for each of the received data sets, the data classification system 102 can determine a particular one of the private and public clouds in which the received data set will be stored. In addition, the data classification system 102 can inform the cloud agent 110 regarding the particular cloud selection made for each of the received data sets. Other than this provision of information regarding selected clouds for received data sets, the data classification system 102 is configured to operate transparently from the viewpoint of the cloud agent 110.

The data classification system 102 in the present embodiment is implemented as a fully automated system that employs semantic reasoning operations to implement dynamic data set classification and cloud classifications in the hybrid cloud 104. Thus, for example, an enterprise data set 114 can be classified and then automatically mapped to an appropriate type of cloud storage, by matching the data set classification with a cloud storage classification, based on a selected one of the mapping policies 126. As indicated above, the data classification system 102 in the present embodiment works transparently between the cloud agent 110 and the various clouds 104-1 through 104-N of the hybrid cloud 104, with the exception of providing the cloud agent 110 with information regarding selected clouds for received data sets.

An exemplary process for directing a particular received data set to a particular target cloud selected from the set of clouds 104-1 to 104-N in the hybrid cloud 104 is as follows:

1. An application or other enterprise user stores a data set 114 in enterprise storage system 112.

2. The cloud agent 110 running in the background in enterprise environment 106 communicates at least a portion of the data set metadata and the data set content to the classifier 116 and the data set is classified.

3. The reasoner 118 utilizes at least a portion of the data set metadata and the data set content to select a particular one of the mapping policies 126 based on applicability, prioritization or any other criteria.

4. The mapper 120 applies the selected mapping policy in order to determine the appropriate target cloud. If the selected policy indicates multiple possible target clouds for the received data set, the mapper can resolve such a situation using another policy, such as random selection, least expensive, least occupied, etc.

5. The data set is directed to the target cloud determined by the mapper 120.

6. The data classification system 102 informs the cloud agent 110 of the target cloud selected for the data set.

Of course, these steps are only examples, and other processes can be used in other embodiments.

It should be noted that the data classification system 102 can be operative in multiple modes, such as a basic classification mode and a complex classification mode. The basic classification mode considers only a limited set of properties to make a simple but quick classification, while the complex classification mode uses more information on data sets, including their relationships with other data sets as characterized by metadata, to choose suitable target clouds within the hybrid cloud 104.

The data classification system 102 and other elements of information processing system 100 may each be implemented using one or more processing platforms. Examples of processing platforms suitable for implementing at least a portion of these and other elements of system 100 will be described below in conjunction with FIGS. 6 and 7. A given such processing platform comprises at least one processing device comprising a processor coupled to a memory, and the processing device may be implemented at least in part utilizing a virtual machine, although other embodiments need not utilize any virtualization.

Although shown in FIG. 1 as being separate from the hybrid cloud 104 and the enterprise environment 106, at least a portion of the data classification system 102 may be implemented within one or more of these system elements. It is also to be appreciated that a given embodiment of the information processing system 100 may include multiple instances of the data classification system 102, the hybrid cloud 104 and the enterprise environment 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
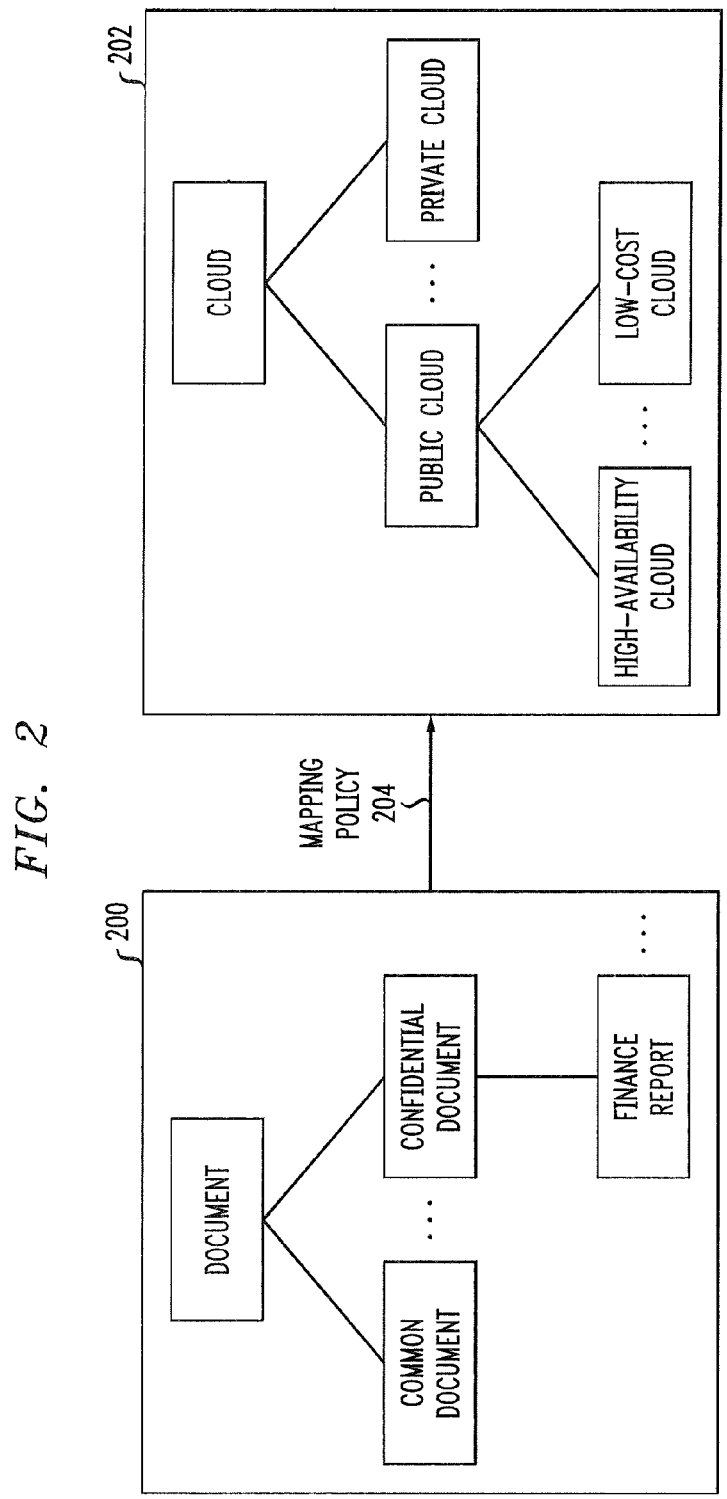
FIG. 2 illustrates an exemplary policy-based mapping between one or more classes of a data set classification model and one or more classes of a cloud classification model in the data classification system of FIG. 1.

With reference now to FIG. 2, examples of possible instances of at least portions of data set classification model 122 and cloud classification model 124 are shown as respective data set classification model 200 and cloud classification model 202, with a selected mapping policy 204 from the mapping policies 126 relating one or more classes of the data set classification model 200 to one or more classes of the cloud classification model 202.

In this embodiment, the data set classification model 200 and the cloud classification model 202 are each arranged in the form of a class hierarchy. The selected mapping policy 204 may comprise a set of rules that can be considered as a function of mapping data sets to target clouds of the hybrid cloud 104. The diagram in FIG. 2 illustrates the domain and range of such a mapping function.

It should be noted that the mapping policy 204 will generally map one or more particular classes of the data set classification model 200 to one or more particular classes of the cloud classification model 202, although the arrow associated with mapping policy 204 in the figure is shown between the models 200 and 202 for simplicity of illustration. Also, multiple selected mapping policies may be combined by the mapper 120 in determining an appropriate mapping for a given received data set.

The exemplary class hierarchy for the data set classification model 200 classifies a data set comprising a document into classes that include, possibly among other classes, a common document class, indicating a document suitable for storage in a public cloud of hybrid cloud 104, and a confidential document class, indicating a document that should be stored in a private cloud of hybrid cloud 104. The confidential document class further includes a number of classes organized by document type, including a finance report class.

The exemplary class hierarchy for the cloud classification model 202 classifies the hybrid cloud 104 into classes that include, possibly among other classes, a private cloud class and a public cloud class. The public cloud class further includes a number of classes organized by parameters such as availability and cost, including a high-availability cloud class and a low-cost cloud class.

As one illustration of a possible mapping policy, an enterprise may specify that, due to privacy concerns about public cloud storage, all documents classified as being finance reports should be stored in a cloud classified as a private cloud. Other mapping policies may specify that certain classes of documents be stored in a cloud that is classified as a high-availability public cloud or classified as a low-cost public cloud. Enterprises or other users can define policies indicating how particular data sets should be handled in the data classification system 102 and policies can be added, modified or otherwise updated over time.

It should be understood that the models 200 and 202 are presented by way of example only, and numerous other classifications of data sets and hybrid clouds may be used in addition to or in place of those shown in FIG. 2. For example, as indicated previously, possible additional classification parameters for private and public clouds in the FIG. 2 embodiment include auditability, capacity, performance and security. Another example is colocation with related documents or other data sets.

FIG. 3 shows one possible embodiment of the reasoner 118 of data classification system 102 in greater detail. In this embodiment, the reasoner 118 comprises a semantic ontology application programming interface (API) 300, a model parser 302, a model updater 304 and a semantic learner 306.

The reasoner 118 as shown may be implemented at least in part as a software module configured to infer logical consequences from a set of asserted facts or axioms. The reasoner is more particularly configured to perform reasoning operations on one or more semantic ontologies so as to facilitate classification of data sets and mapping of data sets to clouds 104-1 through 104-N of the hybrid cloud 104.

The semantic ontology API 300 illustratively provides programming access for adjusting one or more semantic ontologies utilized by the semantic learner 306. As these ontologies may utilize different representations, languages and formats, the semantic ontology API provides a unified interface for the ontologies.

The model parser 302 is configured in the present embodiment to extract information from at least one of the data set classification model 122 and the cloud classification model 124 so as to make that information available to the semantic learner 306 for use in performing one or more reasoning operations.

The model updater 304 adjusts one or more characteristics of at least one of the data set classification model 122 and the cloud classification model 124 responsive to feedback from the semantic learner 306.

By way of example, the semantic learner 306 may be configured to use information from the model parser 302 to identify one or more additional relationship types that are not already captured in current versions of the data set classification model 122 and the cloud classification model 124 and to provide those relationship types to the model updater 304 as part of the above-noted feedback.

The reasoner 118 as illustrated in FIG. 3 can also be configured to perform a variety of other semantic reasoning operations. For example, the reasoner can respond to changes in one or more of the mapping policies 126 by migrating one or more of the data sets to different selected ones of the private and public clouds of hybrid cloud 104.

As a more particular example of a migration scenario, the reasoner 118 may be configured to check ongoing compliance with legal and regulatory requirements as reflected in one or more of the mapping policies 126. Such legal and regulatory requirements typically change over time. Accordingly, such changes can be reflected in updates to the mapping policies, and the reasoner 118 can automatically check the existing data sets stored in different cloud storage locations against the updated policies. Data sets whose placement conflicts with the updated policies will be reported and some specific actions may be taken, such as migrating the data to the new most suitable target.

Similar actions may be taken responsive to detected changes in one or more of the data set classification model 122 and the cloud classification model 124.

The data classification system 102 and components thereof such as classifier 116, reasoner 118 and mapper 120 in processing the received data sets 114 can utilize metadata associated with the received data sets. As indicated above, such metadata characterizes at least one of properties of the data sets and relationships among the data sets.

The metadata may characterize the data sets in accordance with at least one specified semantic ontology utilized by reasoner 118 and possibly other components of the data classification system 102. The semantic ontology may be generated, for example, using an ontology builder such as Protégé and a rules engine such as Jena Semantic Web Framework. The ontology may be implemented at least in part using standardized languages such as Resource Description Framework (RDF) and Web Ontology Language (OWL).

RDF is a language defined by the World Wide Web Consortium (W3C) for representing information about resources in the web. It identifies such resources using Uniform Resource Identifiers (URIs) and models statements about the resources as a directed graph. A given such statement is represented by the elements (Subject, Predicate, Object), also referred to as an RDF triple. Additional details regarding RDF are described in the following W3C Recommendations, all dated Feb. 10, 2004 and incorporated by reference herein: RDF/XML Syntax Specification (Revised); RDF Vocabulary Description Language 1.0: RDF Schema; RDF: Concepts and Abstract Syntax; RDF Semantics; and RDF Test Cases. See also W3C Recommendation RDFa in XHTML: Syntax and Processing, Oct. 14, 2008, which is also incorporated by reference herein.

The OWL language is described in, for example, OWL 2 Web Ontology Language Document Overview, W3C Recommendation 27, October 2009, which is incorporated by reference herein. The OWL 2 Web Ontology Language is an ontology language for the Semantic Web. OWL 2 ontologies generally provide classes, properties, individuals, and data values and are stored as Semantic Web documents. OWL 2 ontologies can be used along with information written in RDF, and OWL 2 ontologies themselves are primarily exchanged as RDF documents.

At least portions of one or more of the data set classification model 122, cloud classification model 124 and mapping policies 126 may be implemented using aspects of standardized languages such as RDF and OWL.

As one example, in an embodiment utilizing RDF for the data set classification model 122, the result of discovery of an additional relationship among data sets may be in the form of a set of RDF triples linking the data sets. Such a relationship may be used as metadata for applying the data set classification model in a current classification operation. If a new relationship type is discovered, that information may be utilized by the reasoner 118 to update the data set classification model.

Also, at least a subset of the data sets processed by the data classification system 102 may make use of standardized languages such as RDF and OWL. An exemplary data set comprising a document in RDF format is shown in FIG. 4. Assume that this document, which is identified in the figure by a document identifier (dc:Docid) given as Document Identifier 1, is originally classified as common data based on its basic properties, and so can be directed to a public cloud. However, by processing the document the reasoner 118 can discover that it has an attachment with a different document identifier, given as Document Identifier 2. Assuming that this attachment is known to be a private document, such as a confidential finance report from the enterprise environment 106, the document identified by Document Identifier 1 will be reclassified such that upon further processing it will be directed to a private cloud.

Embodiments using semantic ontologies based on standardized languages such as RDF and OWL are presented herein by way of illustrative example only, and a wide variety of other types of ontologies may be utilized in the system 100. It is therefore to be appreciated that RDF or OWL are not requirements of any particular embodiment of the invention.

The reasoner 118 of the data classification system 102 utilizes a semantic ontology such as that described above in order to perform one or more reasoning operations on metadata characterizing data sets. For example, such reasoning operations may be used to facilitate selection of a particular mapping policy for use with a given received data set, so as to ensure that the data set is placed in the optimal cloud of the hybrid cloud 104. Of course, this is only an example, and numerous other types of processing may be performed by the reasoner 118 in other embodiments of the invention.

The reasoning process implemented in data classification system 102 for a given received data set may involve utilizing one or more queries based on a semantic ontology of the type described above. For example, the reasoner 118 may perform queries against one or more of the data set classification model 122, the cloud classification model 124 and the mapping policies 126. Such queries may be configured in accordance with a query language such as SPARQL, which is an RDF query language described in, SPARQL Query Language for RDF, W3C Recommendation 15, January 2008, which is incorporated by reference herein. It is to be appreciated, however, that other types of query languages may be used to generate queries in the data classification system 102, including Structured Query Language (SQL) and Object Query Language (OQL).

Although reasoner 118 is illustrated in FIG. 3 as performing semantic reasoning operations, the reasoner may implement other types of reasoning operations that do not rely on semantics. Such additional or alternative reasoning operations may be configured to utilize metadata representations that are not ontologies.

The operation of the information processing system 100 will now be described in greater detail with reference to the flow diagram of FIG. 5, which shows a set of operations performed by the data classification system 102 in an illustrative embodiment. The process as shown includes steps 500 through 512.

In step 500, the data classification system 102 obtains a data set classification model 122 classifying data sets and a cloud classification model 124 classifying private and public clouds of hybrid cloud 104. For example, the data classification system can retrieve such models or portions thereof from a storage device or other memory of a processing platform in which the system is at least partially implemented. Alternatively, the data classification system can generate such models or portions thereof as needed to classify incoming data sets for delivery to particular clouds of the hybrid cloud 104. Various combinations of model retrieval and model generation may also be used.

In step 502, the data classification system 102 instantiates multiple mapping policies 126 each specifying a particular mapping between classes of the data set classification model 122 and classes of the cloud classification model 124. The term "instantiate" in this context is intended to be broadly construed so as to encompass, for example, arrangements in which the mapping policies are received, retrieved, generated or otherwise made available for use in processing incoming data sets in the data classification system 102. As one more detailed illustration, one or more of the mapping policies may be received in the data classification system 102 from the cloud agent 110 or another component of the enterprise environment 106. Alternatively, information that may be used to generate such a policy may be received from the enterprise environment 106. Also, it should be noted that one or more instantiated policies may be subsequently reapplied, and so the term is intended to encompass such a reapplication of a given policy.

In step 504, the data classification system 102 receives a data set from the enterprise storage system 112, such as via the cloud agent 110 in the manner previously described.

In step 506, the data classification system 102 classifies the received data set using the data set classification model 122.

In step 508, the data classification system 102 determines at least one cloud of the hybrid cloud 104 to which the received data set should be directed for storage or other further processing, based at least in part on the result of the classification operation in step 506, the cloud classification model 124, and a selected one of the mapping policies 126.

The data set is then directed to the appropriate cloud or clouds of the hybrid cloud by the data classification system 102. In the present embodiment, the placement of the data set in one or more of the clouds of the hybrid cloud is assumed to be a one-time placement, such that the enterprise will thereafter access the data set in the appropriate cloud or clouds.

Steps 510 and 512 are policy and model update detection steps, respectively, and are shown in dashed outline in the figure. These steps will generally be performed on a relatively infrequent basis compared to the ongoing processing of received data sets using respective iterations of steps 504, 506 and 508 in the remaining portion of the loop.

In step 510, a determination is made as to whether or not there has been a policy update in the data classification system 102. If there has been such an update, the process returns to step 502 to instantiate one or more updated policies before continuing to process an additional received data set in step 504 using the existing models and the updated policies.

In step 512, a determination is made as to whether or not there has been a model update in the data classification system 102. If there has been such an update, the process returns to step 500 to obtain one or more updated models, instantiates mapping policies in step 502 taking into account any model updates, and then continues to process an additional received data set in step 504.

If the determinations in steps 510 and 512 indicate that there are no policy or model updates, the process returns to step 504 to process an additional received data set using existing models and policies.

Additionally, determinations in steps 510 and 512 that there has been a policy or model update can trigger remapping of previously-received data sets and possible migration of those data sets to different clouds of the hybrid cloud.

Instead of using separate steps, the determinations in steps 510 and 512 may be combined into a single step, with the process flow returning to step 500, 502 or 504 as appropriate. Also, one or both of steps 510 and 512 may be omitted in other embodiments.

Figure 5:
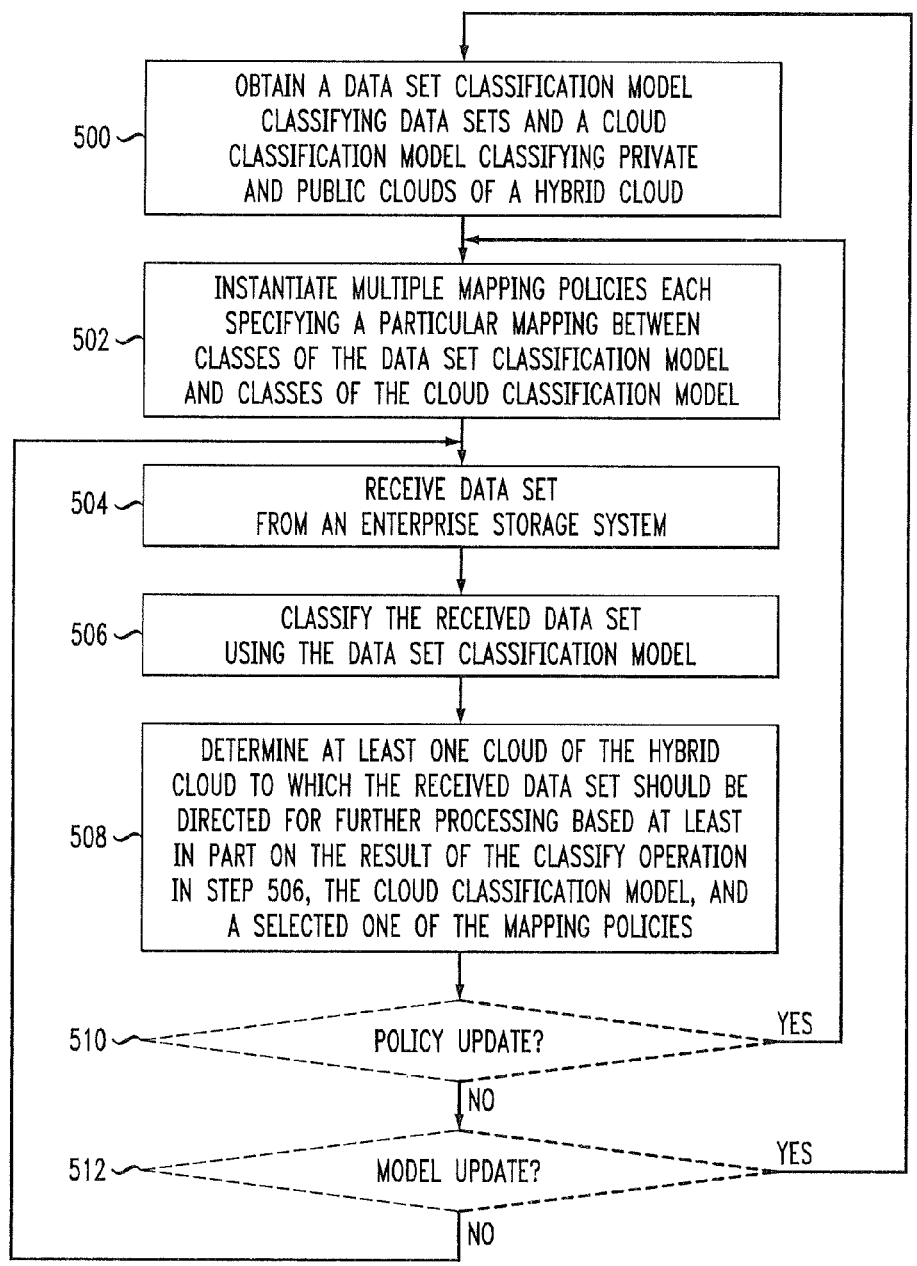
FIG. 5 is a flow diagram illustrating a semantic data classification process implemented by the data classification system of FIG. 1.

The particular processing operations and other system functionality described in conjunction with the flow diagram of FIG. 5 are presented by way of illustrative example only, and should not be construed as limiting the scope of the invention in any way. Alternative embodiments can use other types of processing operations for providing classification of data sets for hybrid clouds in system 100. For example, the ordering of the process steps may be varied in other embodiments, or certain steps may be performed concurrently with one another rather than serially. Also, one or more of the process steps may be repeated periodically for a given data set classification application, or performed in parallel for the given application or multiple applications.

It is to be appreciated that functionality such as that described in conjunction with the flow diagram of FIG. 5 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

The embodiments described above can provide significant advantages over conventional arrangements. For example, through the use of reasoning operations based on one or more semantic ontologies, embodiments of the invention can ensure that data sets are automatically stored or otherwise processed in the appropriate private or public cloud in a manner that satisfies dynamic enterprise policy requirements.

Also, automated data classification is provided for a wide variety of different types of data sets processed in a given enterprise. By automating data classification, multiple features can be enabled in hybrid clouds, including higher accuracy in data classification, policy-based placement of data in complex hybrid cloud environments, unique rules and a single management point for various storage systems in an enterprise environment, automatic policy definition and enrichment by self-learning, consistent compliance guarantees on the placement of enterprise data by regular and on-demand checks, support for different storage systems and cloud vendors, and assistance in data mining and knowledge discovery, based at least in part on metadata provided by data set classification.

In addition, through the use of reasoning based on semantic ontologies, properties and relationships for data sets can be fully explored, discovered and utilized. This approach enhances security and ensures compliance of enterprise data with performance metrics as well as legal and regulatory requirements. It also simplifies policy definition, in that semantic ontologies can be used to define more sophisticated policy rules based on simple ones.

These illustrative embodiments can therefore considerably facilitate the utilization of cloud infrastructure by enterprises.

It was noted above that portions of the information processing system 100 may be implemented using one or more processing platforms. Illustrative embodiments of such platforms will now be described in greater detail.

Figure 6:
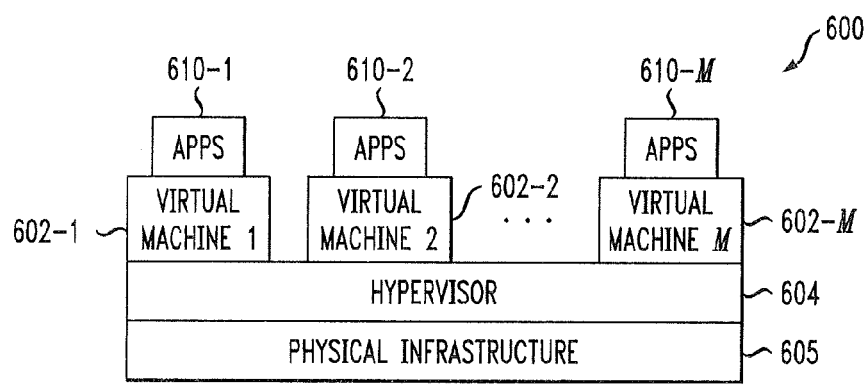
FIGS. 6 and 7 show examples of processing platforms that may be utilized to implement the data classification system as well as other portions of the FIG. 1 information processing system.
Figure 7:
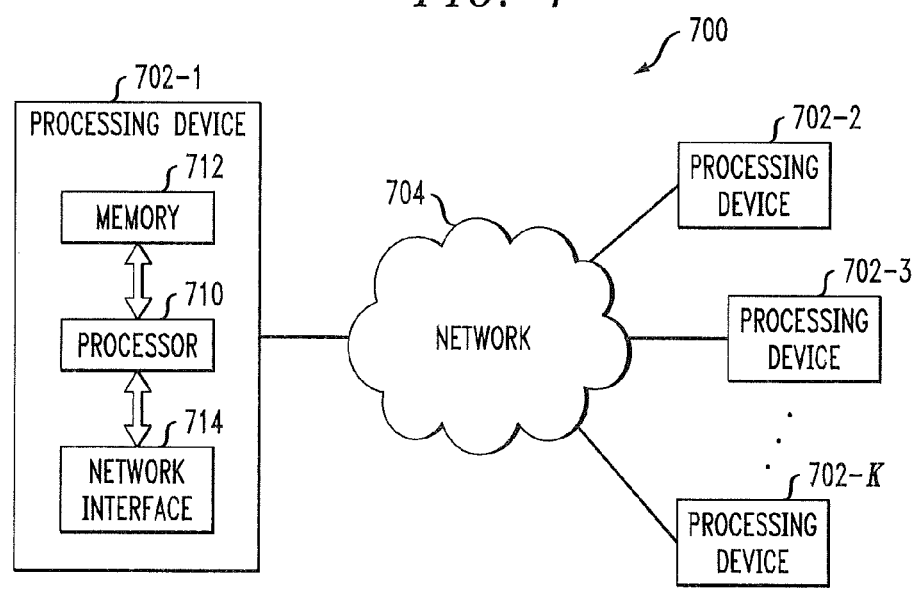

As shown in FIG. 6, portions of the information processing system 100 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system 100 may of course include multiple hypervisors each providing a set of virtual machines using at least one underlying physical machine.

An example of a commercially available hypervisor platform that may be used to implement hypervisor 604 and possibly other portions of the information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of the system 100 and includes a plurality of processing devices, denoted 702-1, 702-2, 702-3, . . . 702-K, which communicate with one another over a network 704.

The network 704 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. The memory 712 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the processing device 702-1 causes the device to perform functions associated with one or more of the modules or other components of system 100, such as the data classification system 102. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the processing device 702-1 is network interface circuitry 714, which is used to interface the processing device with the network 704 and other system components. Such circuitry may comprise conventional transceivers of a type well known in the art.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network.

As indicated previously, data set classification as disclosed herein can be implemented at least in part in the form of one or more software programs stored in memory and executed by a processor of a processing device such as one of the virtual machines 602 or one of the processing devices 702. A memory having such program code embodied therein is an example of what is more generally referred to herein as a "computer program product."

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices and infrastructure arrangements. Numerous other embodiments within the scope of the appended claims will be readily apparent to those skilled in the art.

What is claimed is:

1. An apparatus comprising:
a data classification system associated with a hybrid cloud comprising at least one private cloud and at least one public cloud;
the data classification system comprising a data set classification model classifying data sets, a cloud classification model classifying the private and public clouds of the hybrid cloud into two or more different cloud classes, and a plurality of mapping policies each specifying a particular mapping between one or more classes of the data set classification model and one or more classes of the cloud classification model;
wherein the data classification system is configured to classify a received data set using the data set classification model;
wherein the data classification system further comprises a reasoner configured to determine a selected one of the mapping policies for the received data set, the reasoner comprising:
 a semantic ontology application programming interface;
 a model parser;
 a model updater; and
 a semantic learner;
 wherein the semantic ontology application programming interface provides programming access for adjusting one or more semantic ontologies utilized by the semantic learner;
 wherein the model parser extracts information from at least one of the data set classification model and the cloud classification model so as to make said information available to the semantic learner for use in performing one or more reasoning operations;
 wherein the model updater adjusts one or more characteristics of at least one of the data set classification model, the cloud classification model and one or more of the mapping policies responsive to feedback from the semantic learner; and
 wherein the semantic learner is configured to identify one or more additional relationship types that are not already captured in a current version of at least one of the data set classification model and the cloud classification model and to provide those relationship types to the model updater as part of said feedback;
wherein the data classification system is further configured to determine for the received data set at least one cloud of the hybrid cloud to which the received data set should be directed for further processing based at least in part on a result of the classification of the received data set, the cloud classification model and the selected mapping policy;
wherein the reasoner is further configured to migrate a given data set from a first cloud associated with a first one of the cloud classes to a second cloud associated with a second one of the cloud classes responsive to a change in at least one of the data set classification model, the cloud classification model and one or more of the mapping policies; and
wherein the data classification system is implemented using at least one processing device comprising a processor coupled to a memory.

2. The apparatus of claim 1 wherein the data classification system comprises:
a classifier configured to classify the received data set in accordance with the data set classification model; and
a mapper configured to apply the selected mapping policy for the received data set to determine said at least one cloud to which that received data set should be directed for further processing.

3. The apparatus of claim 1 wherein the data classification system is adapted for coupling between at least one enterprise storage system and the hybrid cloud.

4. The apparatus of claim 3 wherein the data classification system is configured to receive the data set and associated metadata from at least one cloud agent associated with the enterprise storage system.

5. The apparatus of claim 4 wherein the data classification system is further configured to select for the received data set a particular one of the private and public clouds in which the received data set will be stored and to inform the cloud agent regarding its selection for the received data set.

6. The apparatus of claim 2 wherein the classifier in classifying the received data set utilizes metadata associated with the received data set.

7. The apparatus of claim 6 wherein the metadata characterizes at least one of properties of the received data set and relationships between the received data set and one or more other data sets.

8. The apparatus of claim 6 wherein the metadata characterizes the received data set in accordance with at least one specified semantic ontology.

9. The apparatus of claim 1 wherein at least one of the data set classification model, the cloud classification model and the mapping policies are represented at least in part in an RDF format.

10. The apparatus of claim 1 wherein the reasoner is configured to traverse at least one of the data set classification model, the cloud classification model and the mapping policies using one or more SPARQL queries.

11. The apparatus of claim 1 wherein the cloud classification model is based at least in part on designated parameters of the private and public clouds including one or more of auditability, availability, capacity, colocation, cost, performance and security.

12. The apparatus of claim 1 wherein the data set classification model and the cloud classification model are each arranged in the form of a class hierarchy.

13. The apparatus of claim 1 wherein said at least one processing device comprises an element of a processing platform of an information processing system that implements the data classification system and the hybrid cloud.

14. The apparatus of claim 1 wherein the data classification system automatically maps the received data set to an appropriate cloud of the hybrid cloud using the results of the classification of the received data set, the cloud classification model and the selected one of the mapping policies.

15. The apparatus of claim 2 wherein the mapper combines multiple mapping policies to determine said at least one cloud to which the received data set should be directed for further processing.

16. The apparatus of claim 12 wherein the hierarchy for the cloud classification model classifies the hybrid cloud into classes that comprise a private cloud class and a public cloud class.

17. The apparatus of claim 1 wherein:
the data set classification model is configured to classify the received data set based at least in part on relationships between the received data set and one or more other data sets; and
the selected mapping policy for the received data set comprises at least one mapping policy relating to colocation of the received data set with the one or more other data sets based on the relationships between the received data set and the one or more other data sets.

18. The apparatus of claim 1 wherein:
the data set classification model is configured to classify the received data set based at least in part on properties of the received data set; and
the reasoner is configured to modify a data set class of the received data set based on relationships between the received data set and one or more other data sets.

19. A method comprising the steps of:
obtaining a data set classification model classifying data sets and a cloud classification model classifying private and public clouds of a hybrid cloud into two or more different cloud classes;
instantiating a plurality of mapping policies each specifying a particular mapping between one or more classes of the data set classification model and one or more classes of the cloud classification model;
receiving a data set;
classifying the received data set using the data set classification model;
providing programming access for adjusting one or more semantic ontologies utilized by a semantic learner;
extracting information from at least one of the data set classification model and the cloud classification model so as to make said information available to the semantic learner;
performing one or more reasoning operations in the semantic learner;
adjusting one or more characteristics of at least one of the data set classification model, the cloud classification model and one or more of the mapping policies responsive to feedback from the semantic learner;
identifying one or more additional relationship types that are not already captured in a current version of at least one of the data set classification model and the cloud classification model and providing those relationship types as part of said feedback;
determining at least one cloud of the hybrid cloud to which the received data set should be directed for further processing based at least in part on a result of the classifying step, the cloud classification model and a selected one of the mapping policies; and
migrating a given data set from a first cloud associated with a first one of the cloud classes to a second cloud associated with a second one of the cloud classes responsive to a change in at least one of the data set classification model, the cloud classification model and one or more of the mapping policies;
wherein the steps are performed by at least one processing device comprising a processor coupled to a memory.

20. The method of claim 19 further comprising:
receiving the data set and associated metadata from at least one cloud agent associated with an enterprise storage system;
selecting for the received data set a particular one of the private and public clouds in which the received data set will be stored; and
informing the cloud agent regarding selection of a particular one of the private and public clouds for the received data set.

21. A computer program product comprising a non-transitory processor-readable storage medium having encoded therein executable code of one or more software programs, wherein the one or more software programs when executed by the processor of the processing device implement the steps of the method of claim 19.

22. An information processing system comprising:
an enterprise storage system;
a hybrid cloud comprising at least one private cloud and at least one public cloud; and
a data classification system coupled between the enterprise storage system and the hybrid cloud;
wherein the data classification system is configured to classify a received data set using a data set classification model;
wherein the data classification system is further configured to determine for the received data set at least one cloud of the hybrid cloud to which the received data set should be directed for further processing based at least in part on a result of the classification of the received data set, a cloud classification model classifying the private and public clouds of the hybrid cloud into two or more different cloud classes, and a selected one of a plurality of mapping policies each specifying a particular mapping between one or more classes of the data set classification model and one or more classes of the cloud classification model; and
wherein the data classification system further comprises a reasoner configured to determine the selected mapping policy, the reasoner comprising:
a semantic ontology application programming interface;
a model parser;
a model updater; and
a semantic learner;
wherein the semantic ontology application programming interface provides programming access for adjusting one or more semantic ontologies utilized by the semantic learner;
wherein the model parser extracts information from at least one of the data set classification model and the cloud classification model so as to make said information available to the semantic learner for use in performing one or more reasoning operations;
wherein the model updater adjusts one or more characteristics of at least one of the data set classification model, the cloud classification model and one or more of the mapping policies responsive to feedback from the semantic learner;
wherein the semantic learner is configured to identify one or more additional relationship types that are not already captured in a current version of at least one of the data set classification model and the cloud classification model and to provide those relationship types to the model updater as part of said feedback; and
wherein the reasoner is further configured to migrate a given data set from a first cloud associated with a first one of the cloud classes to a second cloud associated with a second one of the cloud classes responsive to a change in at least one of the data set classification model, the cloud classification model and one or more of the mapping policies.

* * * * *